United States Patent
Hamad et al.

(10) Patent No.: US 8,641,890 B2
(45) Date of Patent: Feb. 4, 2014

(54) METHOD FOR REMOVING MERCURY FROM A GASEOUS OR LIQUID STREAM

(71) Applicants: Saudi Arabian Oil Company, Dhahran (SA); Aramco Services Company, Houston, TX (US)

(72) Inventors: Feras Hamad, Dhahran (SA); Ahmed A. Bahamdan, Dhahran (SA); Abdulaziz Naser Al-Mulhim, Dhahran (SA); Ayman Khaled Rashwan, Dhahran (SA); Bandar A. Fadhel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/834,582

(22) Filed: Mar. 15, 2013

(65) Prior Publication Data
US 2013/0287655 A1    Oct. 31, 2013

Related U.S. Application Data

(60) Provisional application No. 61/614,209, filed on Mar. 22, 2012.

(51) Int. Cl.
*C10G 31/09* (2006.01)
(52) U.S. Cl.
USPC ..................................... 208/251 R; 48/127.3
(58) Field of Classification Search
USPC .......... 423/210; 95/234; 208/251 R; 48/127.3
See application file for complete search history.

(56) References Cited

U.S. PATENT DOCUMENTS

| | | |
|---|---|---|
| 3,677,696 A | 7/1972 | Bryk et al. |
| 4,474,896 A | 10/1984 | Chao |
| 4,880,527 A | 11/1989 | Audet |
| 4,915,818 A | 4/1990 | Yan |
| 4,983,277 A | 1/1991 | Audeh et al. |
| 6,129,843 A | 10/2000 | Petty et al. |
| 6,197,269 B1 | 3/2001 | Jansen et al. |
| 6,268,543 B1 | 7/2001 | Sakai et al. |
| 6,355,092 B1 | 3/2002 | Jansen et al. |
| 6,491,822 B2 | 12/2002 | Alper |
| 6,872,370 B2 | 3/2005 | Cooper et al. |
| 7,306,774 B2 | 12/2007 | DeBerry |
| 7,381,388 B2 | 6/2008 | Cooper et al. |

(Continued)

FOREIGN PATENT DOCUMENTS

| | | |
|---|---|---|
| CN | 101053752 A | 10/2007 |
| GB | 2 406 294 B | 2/2006 |

(Continued)

OTHER PUBLICATIONS

International Search Report from PCT/US2013/032072 dated Jun. 4, 2013 (3 pages).

*Primary Examiner* — Timothy Vanoy
(74) *Attorney, Agent, or Firm* — Abelman, Frayne & Schwab

(57) ABSTRACT

The invention relates to a method for removing mercury from mercury containing materials, such as feedstreams, natural gas streams, natural gas condensates, and so forth. The method involves passing a fluid (e.g., gas or liquid) stream containing mercury along a polymeric membrane contact module, while a cleaning or scrubbing solution passes along the other side of the membrane. The scrubbing solution facilitates removal of mercury from the first solution via, e.g., mercury reactive components contained in it.

13 Claims, 1 Drawing Sheet

(56) References Cited

U.S. PATENT DOCUMENTS

| | | |
|---|---|---|
| 7,727,307 B2 | 6/2010 | Winkler |
| 8,506,918 B2 * | 8/2013 | Reddy et al. ............ 423/432 |
| 2006/0029533 A1 | 2/2006 | DeBerry |
| 2006/0116287 A1 | 6/2006 | Durante et al. |
| 2007/0246401 A1 | 10/2007 | Al-Faqeer |
| 2010/0147745 A1 * | 6/2010 | Den Boestert et al. ......... 208/91 |

FOREIGN PATENT DOCUMENTS

| | | |
|---|---|---|
| WO | 9600607 | 1/1996 |
| WO | 9927036 | 6/1999 |
| WO | 0069991 | 11/2000 |
| WO | 0162870 A1 | 8/2001 |
| WO | 20040962308 A1 | 10/2004 |
| WO | 2005/002701 A2 | 1/2005 |

* cited by examiner

METHOD FOR REMOVING MERCURY FROM A GASEOUS OR LIQUID STREAM

RELATED APPLICATION

This application claims priority from U.S. Provisional Application No. 61/614,209 filed Mar. 22, 2012, incorporated by reference in its entirety.

FIELD OF THE INVENTION

This invention relates to an apparatus and method for removing mercury or mercury containing compounds from fluids, e.g., liquids, gases and gaseous condensates. More particularly, it relates to the use of porous membranes and scrubbing solutions which, when used in tandem, remove mercury from the aforementioned fluids.

BACKGROUND AND PRIOR ART

Mercury (Hg), is a contaminant of many natural products, including hydrocarbon fuels. It exists in many forms such as elemental mercury. Organic and inorganic compounds also contain it. In the case of the hydrocarbon fuels mentioned herein, mercury is believed to have originated from geologic deposits from which the fuels, such as natural gas, have been obtained.

The toxicity of mercury containing compounds, even in extremely small quantities, is very well known. Also of importance is the fact that when elemental mercury is present in industrial materials or natural gas streams, it compromises the safety and integrity of the equipment and piping handling these streams, due to issues of metallurgical chemistry. See, e.g., U.S. Pat. No. 4,880,527 to Audeh, incorporated by reference in its entirety.

Given the dangers and the ubiquity of mercury in industrial production, there is a vast literature on ways to remove the substance from materials containing it. In this regard see, e.g., U.S. Pat. No. 7,476,365 to Al-Faqeer, incorporated by reference. Additional references teaching removal of mercury from materials include U.S. Pat. Nos. 7,306,774 to DeBerry; 7,727,307 to Winkler, et al.; 6,197,269 to Jansen, et al.; 4,474,896 to Chao, et al.; 7,381,388 to Cooper, et al.; 6,872,370 to Cooper, et al.; 6,491,822 to Alper; 6,355,092 to Jansen, et al.; WO 2008/116864 to DenBoestert, et al.; and U.S. 2006/0116287 to Durante, et al. All are incorporated by reference herein.

For the most part, these references teach adsorption of contaminants, such as elemental mercury, onto a solid material. None suggests the apparatus or method which constitute features of the invention described herein.

SUMMARY OF THE INVENTION

The invention involves a process and apparatus for removal of mercury from a liquid or gaseous stream, such as a feedstream or process stream (the "first stream" hereafter) by passing the substance on one side of a porous membrane, while passing a second stream, e.g., a "scrubbing stream", which is capable of removing the mercury from the sample, first stream, feedstream, or process stream, on the other side of the membrane. The scrubbing may occur via solubilizing the mercury into the second stream, reacting it with a reactive component in the "scrubbing," or "second" stream, or both.

Transfer of mercury occurs, essentially, through the pores of the porous membranes. The size of the pores is not critical. Membranes associated with nano-, ultra-, and micro-filtration are all within the ambit of the invention; however, pore size and number (surface porosity) provide a means to control the rate of transfer of mercury across the streams, and the interfacial stability between the first and second stream.

The scrubbing solution, also referred to as "absorbent liquid," can be any solution capable of solubilizing or reacting with mercury, or performing both tasks. Exemplary of materials which can be included in the solution are alkali metal sulfides, ammonium bisulfide salts, disulfide salts, polysulfide salts (salts which contain $S_x$, where x>2), hydrogen peroxide, perchlorate, and other materials known to the skilled artisan.

The scrubbing solution may be treated, e.g., to remove solid precipitate, and/or to have relevant chemicals added to replenish the solution, and then be recirculated. Of course, the skilled artisan will recognize that a completely new solution may be used as well.

The invention as described herein provides non-dispersive contact between the two streams, which is a distinct advantage over the conventional, dispersed phase systems now employed, including liquid/liquid extraction, and gas/liquid scrubbing and absorption.

Problems encountered by the art, including solvent holdup, formation of emulsions, foaming, unloading and flooding, are all avoided.

Further, the invention allows for very high packing densities of the membranes, and as a result the units employed are much smaller than the units now seen in industrial practice.

Also, as compared to the state of the art, the membranes are functional in both horizontal and vertical placement, as compared to vertical only, which is an advantage in terms of deployment in standard systems.

Features of the invention will be seen in the disclosure which follows.

DETAILED DESCRIPTION OF PREFERRED EMBODIMENTS

Figure 1:
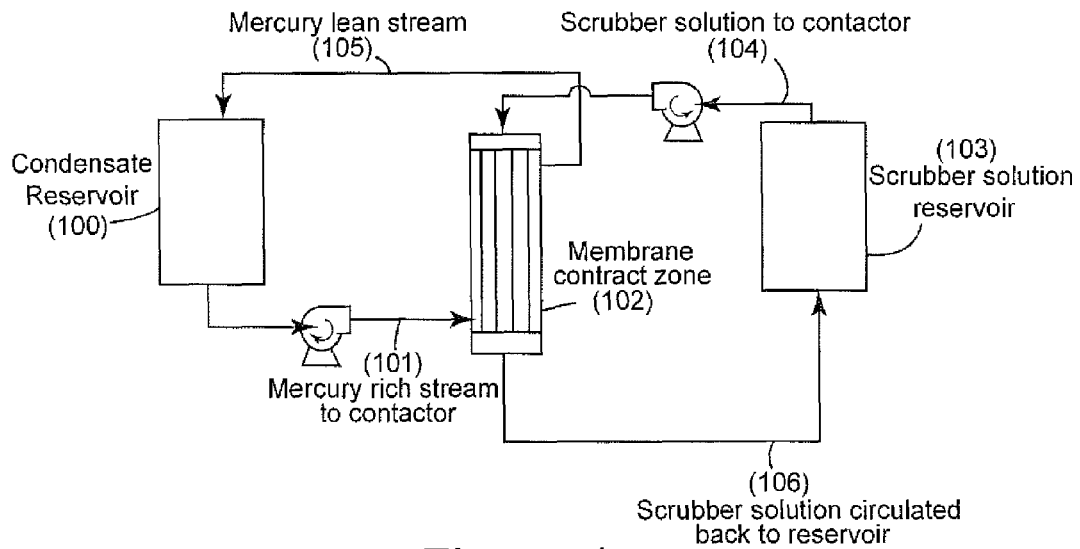
FIG. 1 depicts one embodiment of the invention.

FIG. 1 of this disclosure shows one embodiment of the invention. Referring to this figure a condensate reservoir "100" contains the mercury rich material which requires treatment. This can be, e.g., natural gas, a condensate of natural gas, a liquid hydrocarbon, or any other material containing mercury. The material is transmitted via, e.g., a pipe means "101" or any other type of conduit, to a porous membrane in the form, e.g., of a membrane contractor module "102," elaborated upon infra, and back to reservoir "100" through conduit "105". This porous membrane or membranes in membrane contractor module 102 may take the form of a flat sheet, hollow fibers, a disc, a spiral wound, or other configurations well known to the skilled artisan. The materials used to make the membranes may vary. Exemplary materials are polypropylene, PolyEther Ether Ketone (PEEK), Tefflon (PTFE), PolyVinyliDene Fluoride (PVDF), as well as any other polymeric hollow fiber material which is compatible with the first and second stream. The material passes over the porous membrane contact zone module 102 and contacts a scrubbing solution within the pores of the membrane. The scrubbing solution is circulated from a scrubbing solution reservoir "103" through conduit "104" and the porous membrane contactor "102", then through conduit "106" back to reservoir "103".

The fluids may flow in counter directions, as in this example, or in co-directions.

Mercury transfers from the mercury rich stream to the scrubbing solution stream that is in direct contact with it within the pores of the membrane contactor module 102. Thus, stream "105" will be leaner in mercury, while stream "106" will be richer in mercury.

Figure 2:
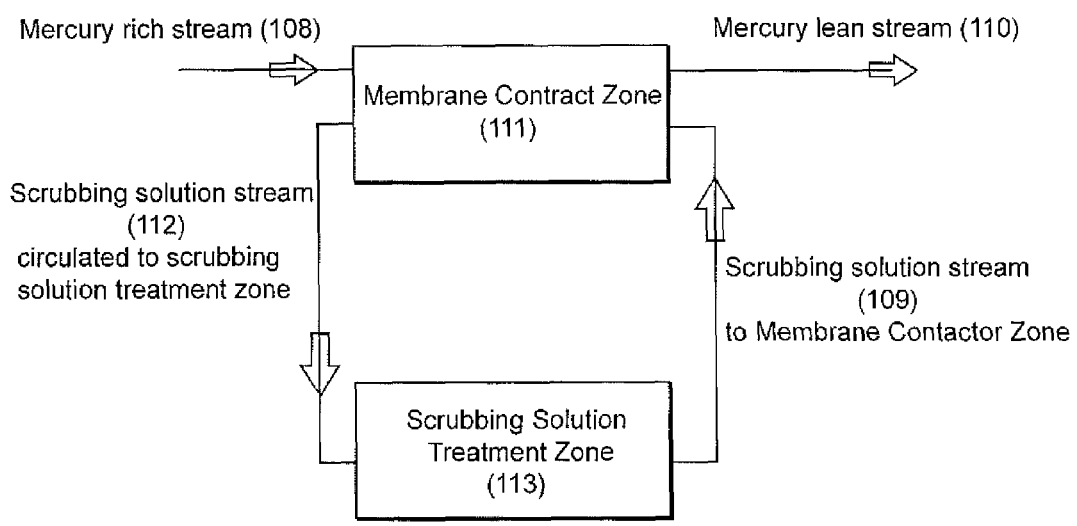
FIG. 2 shows a second embodiment of the invention.

A second embodiment of the invention is depicted in FIG. 2. In this figure, a mercury rich stream "108" is brought into contact with scrubbing solution "109", via membrane contractor zone 111, resulting in a "mercury lean" stream "110", following the flow of both streams past the membrane contact zone "111". The resulting mercury rich scrubbing solution stream "112" is circulated back to the "scrubbing solution treatment zone "113".

The "scrubbing solution treatment zone" 113, may contain additional materials and equipment such as one or more storage tanks for fresh scrubbing solution, scrubbing solution which has been used, and treated to remove the mercury, or used scrubbing solution which is to be either treated, or disposed of Storage tanks may also be provided for each of these. The zone may also include, e.g., means for treating solutions such as mercury containing scrubbing streams so as to filter solids, be these mercury compounds or other solids, sedimentation or segregation units, as well as means for replenishing and/or adjusting the scrubbing solution.

EXAMPLE 1

A system as shown in FIG. 1 was used. A stabilized condensate was spiked with mercury, to obtain a mercury rich sample of 3 ppm.

A hollow fiber membrane module type was built by bundling seven hollow, porous polypropylene fibers and cementing them, with epoxy, into polyethylene tubes and PVC-Y fittings, to form a shell, and inlet/exit ports. Relevant properties of the fibers included an OD of ~2500 μm, and pore sizes from 2 to 20 μm.

The spiked condensate was then circulated from a condensate reservoir and then back to it, through the lumen side of the hollow fibers. Simultaneously, a polysulfide solution composed of 15.6 wt % of NaOH, 6.3 wt % $S_8$, and 78.1 wt % $H_2O$ was circulated from its own reservoir, through the hollow fiber module outside the bores, that is, on the shell side.

Circulation of both liquids was facilitated via calibrated, internally lined gear pumps, with plastic tubing.

Samples were analyzed over time, using standard Cold Vapor Atomic Fluorescence ("CVAF"). As the spiked condensate and polysulfide solutions circulated in the system, they were sampled to track the mercury content in the condensate. The results are presented below, as an average of the multiple analyses for each sample with standard deviation of the analysis.

| Time (min) | [Hg] (ppb) | SD % |
|---|---|---|
| 1 | 3001 | 0.8 |
| 90 | 850 | 6.8 |
| 190 | 749 | 2.9 |

EXAMPLE 2

The following table shows the results for the mass transfer of mercury through the pores of different ultrafiltration membranes obtained from Millipore Company, again using the embodiment of FIG. 1.

| Membrane Contactor (Millipore Part Number) | porosity % | thickness (μm) | nominal pore size (μm) | Contactor transfer coefficient (ppb/cm/hr) |
|---|---|---|---|---|
| PTFE-0.2 um (JGWP) | ~80% | 65 | 0.2 | 26.4 |
| PVDF-0.1 um (VVLP) | ~70% | 125 | 0.1 | 28.5 |
| PVDF-0.1 um (VVLP) | ~70% | 125 | 0.1 | 32.1 |

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A method for reducing amount of mercury in a liquid, comprising flowing a mercury containing liquid first stream on one side of a porous membrane while flowing a second stream containing at least one compound which reacts with or solubilizes said mercury on the other side of said porous membrane to permit contact of first and second stream via said pores, so as to remove mercury from said liquid first stream.

2. The method of claim 1, wherein said porous membrane comprises a polymeric material.

3. The method of claim 1, wherein said porous membrane comprises polypropylene, PolyEther Ether Ketone (PEEK), Teflon (PTFE), or PolyVinylidene Fluoride (PVDF).

4. The method of claim 1, wherein said porous membrane comprises non-polymeric material.

5. The method of claim 4, wherein said porous membrane comprises pores having sizes useful for nanofiltration, or ultrafiltration, or microfiltration.

6. The method of claim 1, wherein said porous membrane comprises hollow fibers, flat sheets or discs.

7. The method of claim 1, comprising contacting the liquid first stream and second stream in a hollow fiber membrane module or in a spiral wound membrane module.

8. The method of claim 1, wherein said second stream comprises an alkali metal sulfide, an ammonium bisulfide salt, a disulfide salt, a polysulfide salt, a hydrogen peroxide, or a perchlorate.

9. The method of claim 8, wherein said second stream comprises an alkali metal sulfide, an ammonium bisulfide salt, a disulfide salt, or a polysulfide salt.

10. The method of claim 9, wherein said polysulfide salt is $S_8$.

11. The method of claim 1, wherein said method is carried out continuously.

12. The method of claim 1, wherein said method is carried out in batch mode.

13. The method of claim 1, further comprising treating said mercury containing second stream solution to remove mercury therefrom.

* * * * *